United States Patent
Datas et al.

(10) Patent No.: US 11,319,091 B2
(45) Date of Patent: May 3, 2022

(54) TRANSPORT CARRIAGE WITH TWO HEXAPOD PLATFORMS WITH INCREASED RANGE OF MOVEMENT

(71) Applicants: Airbus Operations SAS, Toulouse (FR); Airbus SAS, Blagnac (FR)

(72) Inventors: Jean-Marc Datas, Toulouse (FR); Jacques Bouriquet, Toulouse (FR); Jean-Mickael Brindeau, Blagnac (FR); Patrick Guibert, Blagnac (FR); Nicolas Darbonville, Blagnac (FR)

(73) Assignees: Airbus Operations SAS, Toulouse (FR); Airbus SAS, Blagnac (FR)

( * ) Notice: Subject to any disclaimer, the term of this patent is extended or adjusted under 35 U.S.C. 154(b) by 88 days.

(21) Appl. No.: 16/883,247

(22) Filed: May 26, 2020

(65) Prior Publication Data
US 2021/0016901 A1    Jan. 21, 2021

(30) Foreign Application Priority Data
May 28, 2019   (FR) ..................... 1905679

(51) Int. Cl.
*B64F 5/50*    (2017.01)
(52) U.S. Cl.
CPC ..................... *B64F 5/50* (2017.01)
(58) Field of Classification Search
CPC .... B64F 5/50; B64F 5/10; G05B 2219/50162; B25J 9/0033; B25J 9/1623; B64C 1/26; B64C 3/00
See application file for complete search history.

(56) References Cited

U.S. PATENT DOCUMENTS

| 4,440,265 A | * | 4/1984 | Spagnoli | .................. B66F 7/04 |
| | | | | 182/129 |
| 7,175,168 B2 | * | 2/2007 | Hardaker | .................. B64F 5/50 |
| | | | | 244/1 R |

(Continued)

FOREIGN PATENT DOCUMENTS

| CN | 105459078 A | 4/2016 |
| DE | 102009042014 A1 | 3/2011 |

(Continued)

OTHER PUBLICATIONS

French Search Report; priority document.
This application is subject matter related U.S. Appl. No. 16/878,015 and U.S. Appl. No. 16/878,015.

*Primary Examiner* — Lawrence Averick
(74) *Attorney, Agent, or Firm* — Greer, Burns & Crain, Ltd.

(57) ABSTRACT

A carriage with two hexapod platforms, each having a base, a plate, and a set of six cylinders associated in pairs. Each cylinder is articulatedly mounted with the plate. For each pair, a slider is able to move in translation on the base. For a first pair, the two cylinders of the first pair are mounted in an articulated manner on the slider. The articulation of one of the two cylinders of the first pair with the plate is adjacent to the articulation of one of the two cylinders of a second pair with the plate. The articulation of the other of the two cylinders of the first pair with the plate is adjacent to the articulation of one of the two cylinders of a third pair with the plate. For each slider, a movement system moves the slider. A control unit controls each cylinder and the movement system.

5 Claims, 3 Drawing Sheets

(56) References Cited

U.S. PATENT DOCUMENTS

| | | | | |
|---|---|---|---|---|
| 8,602,713 B1* | 12/2013 | Davis | ................. | B60P 1/34 |
| | | | | 414/589 |
| 2008/0205763 A1 | 8/2008 | Marsh et al. | | |
| 2010/0038024 A1* | 2/2010 | Brandt | ................. | B64F 5/10 |
| | | | | 156/249 |
| 2010/0264573 A1* | 10/2010 | Kott | ................. | B64F 5/50 |
| | | | | 269/55 |
| 2011/0054694 A1* | 3/2011 | Munk | ................. | B64F 5/10 |
| | | | | 700/275 |
| 2012/0110816 A1* | 5/2012 | Groves | ................. | B66F 7/28 |
| | | | | 29/428 |
| 2015/0353300 A1* | 12/2015 | Grossman | ................. | B64F 5/00 |
| | | | | 700/226 |

FOREIGN PATENT DOCUMENTS

EP             2368799 A1    9/2011
KR        20100124619 A    11/2010

* cited by examiner

US 11,319,091 B2

TRANSPORT CARRIAGE WITH TWO HEXAPOD PLATFORMS WITH INCREASED RANGE OF MOVEMENT

CROSS-REFERENCES TO RELATED APPLICATIONS

This application claims the benefit of the French patent application No. 1905679 filed on May 28, 2019, the entire disclosures of which are incorporated herein by way of reference.

FIELD OF THE INVENTION

The present invention relates to a transport carriage with two hexapod platforms of the Stewart platform type, having an architecture that allows an amplified range of movement of the plate.

BACKGROUND OF THE INVENTION

A hexapod platform conventionally has a base and a plate and a set of six cylinders, each of which is mounted in an articulated manner between the base and the plate that is able to receive an object to be supported.

The cylinders are disposed in pairs, wherein, in a pair, the articulations of the cylinders of the pair with the base are adjacent, while the articulation of one of the two cylinders of the pair with the plate is adjacent to the articulation of one of the two cylinders of a second pair with the plate, and while the articulation of the other of the two cylinders of the pair with the plate is adjacent to the articulation of one of the two cylinders of a third pair with the plate.

Such a hexapod platform allows an object disposed on the plate to be manipulated, and a particular elongation of each cylinder corresponds to each position of the plate.

Although such a hexapod platform is satisfactory, it is necessary to find a novel architecture that makes it possible to amplify the range of movement of the plate, in particular when the platform is installed on a transport carriage.

SUMMARY OF THE INVENTION

An object of the present invention is to propose a transport carriage with two hexapod platforms, which has an architecture that allows a greater amplitude of the range of movement of the plate.

To this end, a transport carriage for joined wings of an aircraft is proposed, wherein the transport carriage has a plane of vertical symmetry, a chassis mounted on wheels, a set of supporting elements mounted on the chassis, each of which is intended to come to bear beneath a structure of the aircraft, and, on either side of the median plane, a hexapod platform having:
  a base secured to the chassis,
  a plate intended to bear beneath a wing,
  a set of six cylinders associated in pairs, wherein each cylinder is mounted so as to be articulated with the plate,
  for each pair, a slider mounted so as to be able to move in translation on the base in a translation direction, wherein the two cylinders of the pair are mounted in an articulated manner on the slider,
  for each slider, a movement system that moves the slider parallel to the translation direction, and
  a control unit that controls each cylinder and each movement system.

Such a carriage with such hexapod platforms allows a greater amplitude of the range of movement of the plate by movement of the movement systems.

Advantageously, the plate has three articulation zones that are distributed at the three vertices of a triangle, and, in each articulation zone, two cylinders from two different pairs are articulated to the plate.

Advantageously, the three translation directions are horizontal and converge at a single point.

Advantageously, the three translation directions are disposed at 120° with respect to one another.

Advantageously, the base has a stop on which the plate comes to bear in a lowered position.

BRIEF DESCRIPTION OF THE DRAWINGS

The abovementioned features of the invention, along with others, will become more clearly apparent on reading the following description of an exemplary embodiment, the description being given with reference to the appended drawings, in which.

DETAILED DESCRIPTION OF THE PREFERRED EMBODIMENTS

Figure 1:
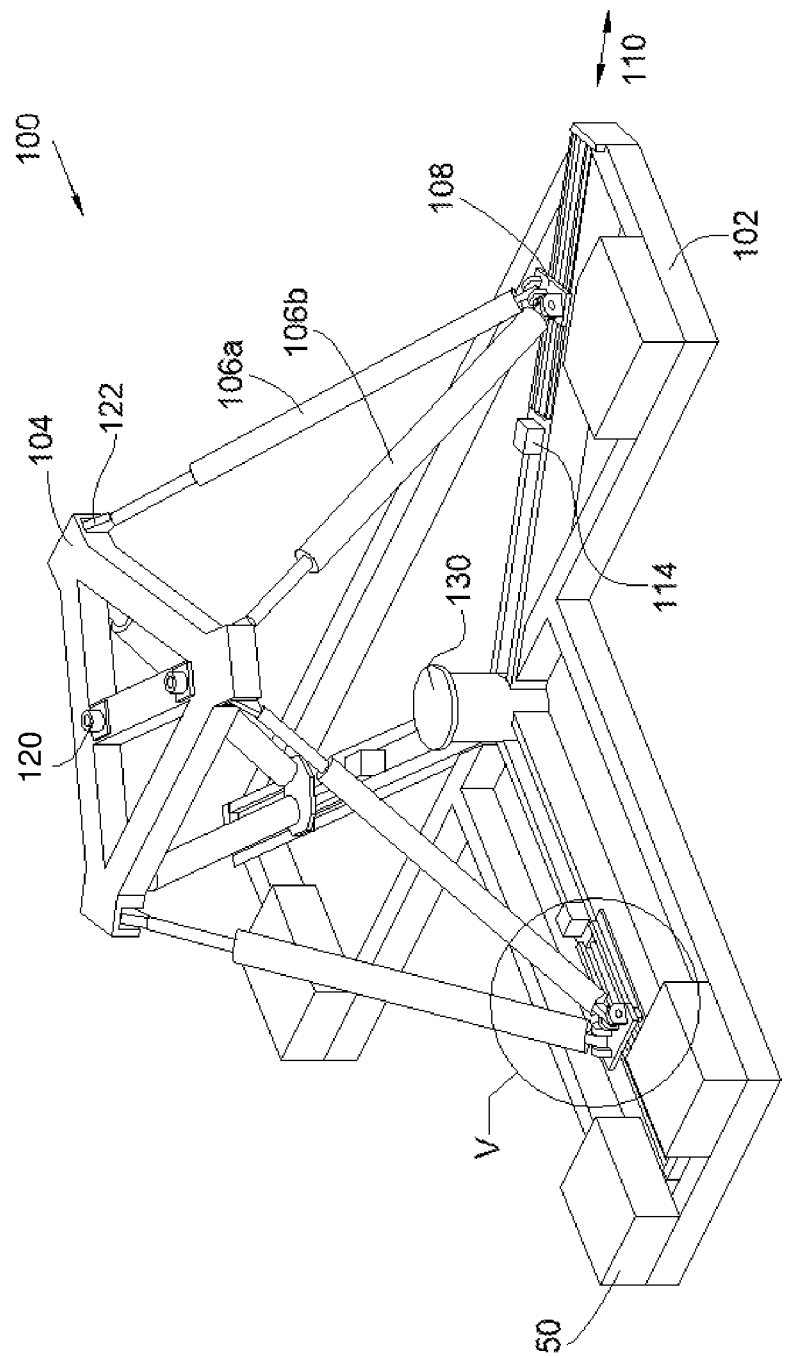
FIG. 1 is a perspective view of a hexapod platform according to the invention.

FIG. 1 shows a hexapod platform 100 that has a base 102, a plate 104 and a set of six cylinders 106a-b associated in pairs.

The hexapod platform 100 also has, for each pair, a slider 108 that is mounted so as to be able to move in translation on the base 102 in a translation direction 110 and the two cylinders 106a-b of the pair are mounted in an articulated manner on the slider 108. Each slider 108 is able to move between two extreme positions.

The three translation directions 110 are horizontal and converge at a single point.

In the embodiment of the invention that is presented here, the three translation directions 110 are furthermore disposed at 120° with respect to one another.

Each cylinder 106a-b is mounted so as to be articulated with the plate 104 that is able to receive an object to be supported, in this case by way of fastening pegs 120.

The hexapod platform 100 also has, for each slider 108, a movement system that moves the slider 108 parallel to the translation direction 110 along the base 102.

Thus, depending on the requirements, it is possible to move each slider 108 in order to increase the amplitude of movement of the plate 104.

The hexapod platform 100 also has a control unit that controls the elongation of each cylinder 106a-b and the movement system.

The plate 104 has three articulation zones that are distributed at the three vertices of a triangle, and, in each articulation zone, two cylinders 106a-b from two different pairs are articulated to the plate 104.

More particularly, in the embodiment of the invention that is presented in the figures, in a first pair, the two cylinders 106a-b of the first pair are mounted in an articulated manner on the same associated slider 108, while the articulation of one of the two cylinders 106a of the first pair with the plate 104 is adjacent to the articulation of one of the two cylinders of the second pair with the plate 104, and while the articulation of the other of the two cylinders 106*b* of the first pair with the plate 104 is adjacent to the articulation of one of the two cylinders of the third pair with the plate 104. This installation is thus repeated for the three pairs.

The hexapod platform 100 may adopt different characteristic positions:

A lowered position, in which the cylinders 106*a-b* are completely retracted and each slider 108 is remote from the point of convergence, so as to lower the plate 104 and thus obtain a hexapod platform 100 that is less bulky and more stable due to its lower center of gravity.

An intermediate position, in which the cylinders 106*a-b* are completely retracted and each slider 108 is close to the point of convergence at a nominal position, so as to raise the plate 104 by working only with the sliders 108. The cylinders 106*a-b* then behave like rigid bars. The nominal position of each slider 108 corresponds generally to the midpoint between the two extreme positions.

A nominal use position, in which each slider 108 is in its nominal position, and each cylinder 106*a-b* is controlled depending on the position that the plate 104 has to adopt.

The base 102 may optionally be equipped with movement means that move the base 102 over the ground. The movement means take, for example, the form of motorized wheels represented here by motor cowlings 150, each of which contains a motor and a wheel driven by the motor. The movement means may take other forms, such as an air cushion generator, for example. The control unit also controls each movement means, i.e., in this case each motorized wheel.

Figure 2:
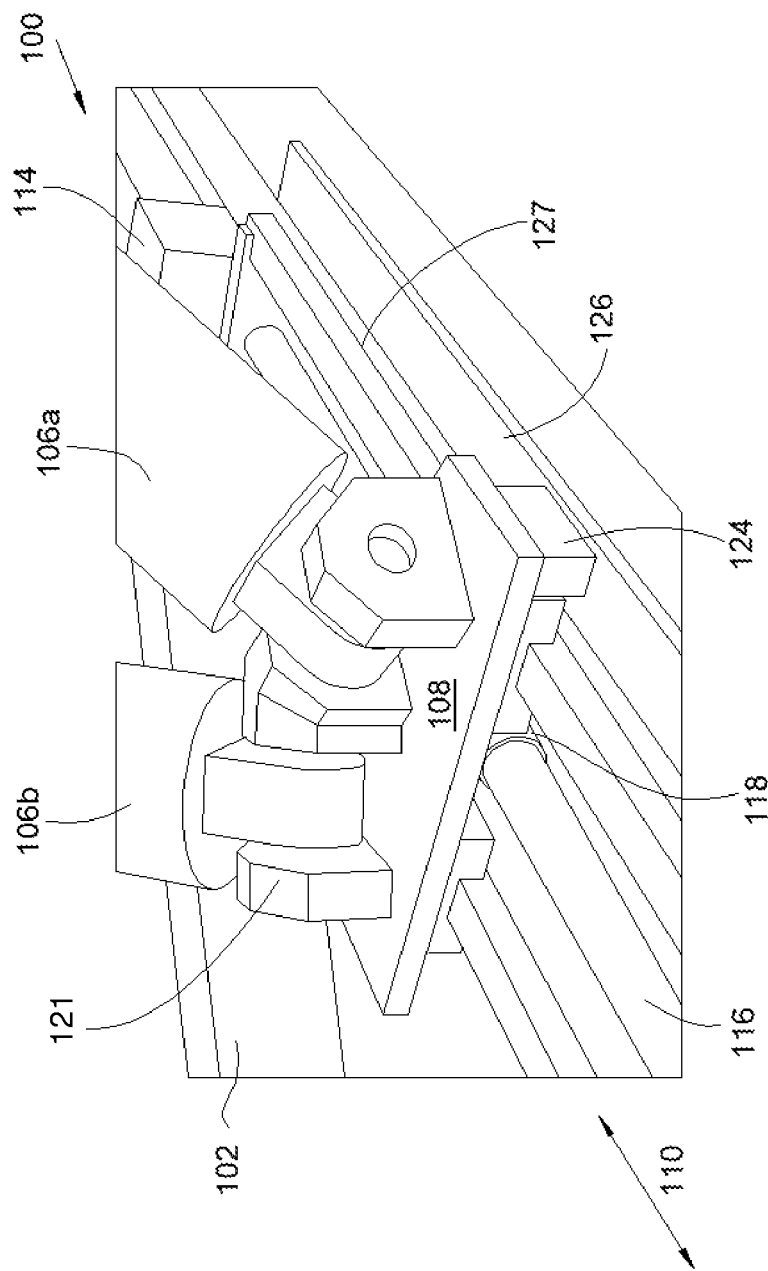
FIG. 2 is a perspective view of the detail II in FIG. 1.

FIG. 2 shows an enlargement of an embodiment of the movement system and of the slider 108. In the embodiment of the invention that is presented here, the movement system has a motor 114 and a ball screw 116 of which the axis is parallel to the translation direction 110. The ball screw 116 is driven in rotation by the motor 114 and the slider 108 meshes with the ball screw 116 by way of a nut 118 secured to the slider 108. Each movement system may also take the form of a cylinder.

The control unit also controls each movement system, i.e., in this case each motor 114.

In the embodiment of the invention that is presented in FIGS. 1 and 2, each articulation of a cylinder 106*a-b* with the slider 108 is realized by a clevis 121, and each articulation of a cylinder 106*a-b* with the plate 104 is realized by a clevis 122.

In order to determine the position of the slider 108 parallel to the translation direction 110, the movement system has a localization system that in this case takes the form of a magnetic encoder 124 that moves along a magnetic scale 126.

The localization system communicates with the control unit so as to allow the movement system to be controlled depending on the requirements.

In the embodiment of the invention that is presented in FIG. 2, the slider 108 moves on two linear guides 127 that are parallel to the translation direction 110.

In the lowered position, the plate 104 comes as close as possible to the base 102, and in order to avoid the plate 104 passing below a limit position that would make transfer to the intermediate position difficult, the base 102 has a stop 130 on which the plate 104 comes to bear in the lowered position. In this case, the stop 130 takes the form of a peg that is aligned vertically with the point of convergence.

The control unit has, connected by a communication bus: a processor or CPU (central processing unit); a random access memory (RAM); a read-only memory (ROM); a storage unit such as a hard disk or a storage medium reader, such as an SD (secure digital) card reader; at least one communication interface that allows the control unit to communicate with each motorized wheel, the movement system and each cylinder 106*a-b*.

The processor is capable of executing instructions loaded into the RAM from the ROM, from an external memory (not shown), from a storage medium (such as an SD card), or from a communication network. When the equipment is powered up, the processor is capable of reading instructions from the RAM and executing them. These instructions form a computer program that causes the processor to implement all or some of the algorithms and steps allowing the handling system 100 to function.

All or some of the algorithms and steps may be implemented in software form through the execution of a set of instructions by a programmable machine, for example a DSP (digital signal processor) or a microcontroller, or may be implemented in hardware form by a machine or a dedicated component, for example an FPGA (field-programmable gate array) or an ASIC (application-specific integrated circuit).

Figure 3:
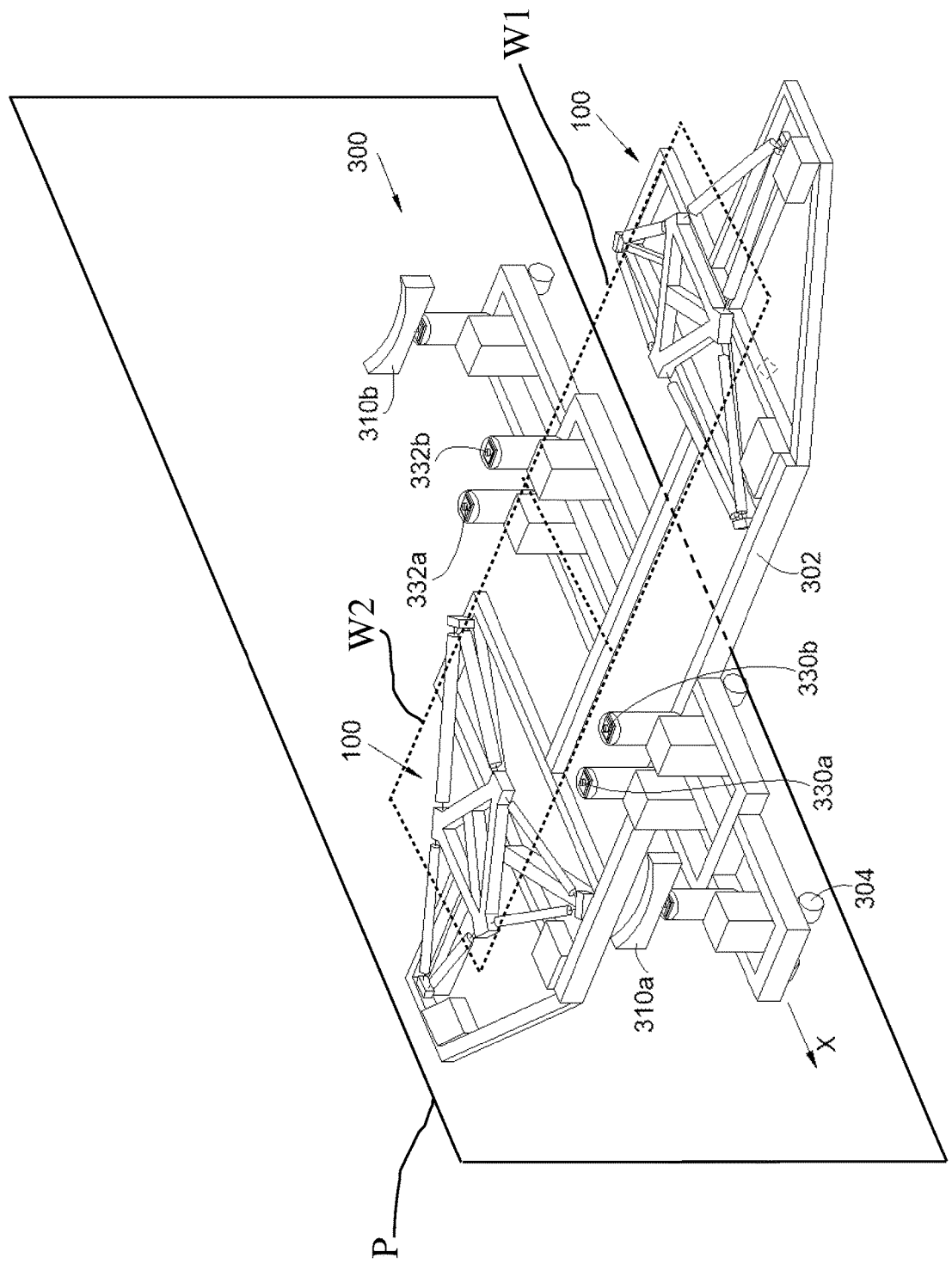
FIG. 3 is a perspective view of a transport carriage having two hexapod platforms according to the invention.

FIG. 3 shows a transport carriage 300 that makes it possible to transport wings of an aircraft and to position them beneath the structure of the aircraft, i.e., at the location where they are to be fastened. The transport carriage 300 is more particularly suitable for transporting adjoining wings, i.e., two joined wings, i.e., wings W1, W2 that are fastened to one another at a proximal end intended to be fastened to the fuselage of the aircraft.

The transport carriage 300 has a chassis 302 that is mounted on wheels 304, at least some of which may be motorized. The transport carriage 300 has a longitudinal axis X that is the main direction of travel of the wheels 304 and a median plane of vertical symmetry P that passes through the longitudinal axis X. The zone where the wings W1 W2 are joined is disposed in the median plane P.

On either side of the median plane, the transport carriage 300 has a hexapod platform 100 according to the invention, wherein the base 102 is secured to the chassis 302, and wherein each plate 104 is intended to bear beneath one of the wings.

In order to improve the seat of the aircraft during the mounting of the wings, the transport carriage 300 has a set of supporting elements, each of which is mounted on the chassis 302. The supporting elements in this case comprise a front cradle 310*a*, a rear cradle 310*b*, and also two front support cylinders 330*a-b* and two rear support cylinders 332*a-b*.

Each cradle 310*a-b* is intended to come to bear beneath the structure of the aircraft.

Each of the support cylinders 330*a-b*, 332*a-b* has a support mounted on the stem of the support cylinder and intended to come to bear beneath the structure of the aircraft.

Thus, when the supporting elements are placed so as to bear beneath the structure of the aircraft, each plate 104 may be moved so as to lift the wings in order to bring them closer to the structure of the aircraft where they are to be fastened.

The use of two hexapod platforms 100 for supporting wings ensures a high degree of flexibility and a high capacity for adjustment in the position of the wings. The positioning of the wings as they move closer to the structure of the aircraft is ensured with a very high degree of precision.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A transport carriage for joined wings of an aircraft, wherein said transport carriage comprises:
   a plane of vertical symmetry,
   a chassis mounted on wheels,
   a set of supporting elements mounted on the chassis, each of which is configured to come to bear beneath a structure of the aircraft, and,
   on either side of a median plane, a hexapod platform comprising:
      a base secured to the chassis,
      a plate configured to bear beneath a wing,
      a set of six cylinders associated in pairs, wherein each cylinder is mounted so as to be articulated with the plate,
      for each pair, a slider mounted so as to be able to move in translation on the base in a translation direction, wherein the two cylinders of said pair are mounted in an articulated manner on the slider, and,
      for each slider, a movement system that moves the slider parallel to the translation direction.

2. The transport carriage according to claim 1, wherein the plate has three articulation zones that are distributed at three vertices of a triangle, and, in each articulation zone, two cylinders from two different pairs are articulated to the plate.

3. The transport carriage according to claim 1, wherein the three translation directions are horizontal and converge at a single point.

4. The transport carriage according to claim 3, wherein the three translation directions are disposed at 120° with respect to one another.

5. The transport carriage according to claim 1, wherein the base has a stop on which the plate comes to bear in a lowered position.

* * * * *